US009103746B2

(12) United States Patent
Kaufhold et al.

(10) Patent No.: US 9,103,746 B2
(45) Date of Patent: Aug. 11, 2015

(54) OTDR MAPPING METHOD

(71) Applicant: United Technologists Europe Limited, Hadleigh, Suffolk (GB)

(72) Inventors: Frank Gerwin Kaufhold, Hadleigh (GB); Jiliang Yu, Hadleigh (GB)

(73) Assignee: United Technologists Europe Limited (GB)

( * ) Notice: Subject to any disclaimer, the term of this patent is extended or adjusted under 35 U.S.C. 154(b) by 0 days.

(21) Appl. No.: 14/342,719

(22) PCT Filed: Jan. 15, 2013

(86) PCT No.: PCT/GB2013/050079
§ 371 (c)(1),
(2) Date: Mar. 4, 2014

(87) PCT Pub. No.: WO2013/117897
PCT Pub. Date: Aug. 15, 2013

(65) Prior Publication Data
US 2014/0226152 A1 Aug. 14, 2014

(30) Foreign Application Priority Data

Feb. 10, 2012 (GB) .................................. 1202347.9

(51) Int. Cl.
*G01M 11/00* (2006.01)
*H04B 10/071* (2013.01)

(52) U.S. Cl.
CPC ...... *G01M 11/3109* (2013.01); *G01M 11/3136* (2013.01); *H04B 10/071* (2013.01)

(58) Field of Classification Search
None
See application file for complete search history.

(56) References Cited

U.S. PATENT DOCUMENTS

| 5,066,118 | A | * | 11/1991 | Buerli | 356/73.1 |
| 5,373,356 | A | * | 12/1994 | Anderson | 356/73.1 |
| 6,028,661 | A | * | 2/2000 | Minami et al. | 356/73.1 |
| 6,310,702 | B1 | * | 10/2001 | Minami et al. | 398/13 |
| 6,512,610 | B1 | * | 1/2003 | Minami et al. | 398/21 |
| 6,534,997 | B1 | * | 3/2003 | Horishita et al. | 324/534 |
| 8,077,298 | B2 | * | 12/2011 | Wang et al. | 356/73.1 |
| 2008/0291431 | A1 | * | 11/2008 | Wang et al. | 356/73.1 |
| 2009/0092388 | A1 | * | 4/2009 | Yang | 398/13 |
| 2009/0190921 | A1 | * | 7/2009 | Nakajima et al. | 398/13 |
| 2011/0268438 | A1 | * | 11/2011 | Daems | 398/16 |
| 2012/0002959 | A1 | * | 1/2012 | Melamed | 398/10 |
| 2012/0045205 | A1 | * | 2/2012 | Perron | 398/48 |
| 2012/0163800 | A1 | * | 6/2012 | Urban | 398/12 |
| 2012/0237213 | A1 | * | 9/2012 | Yin et al. | 398/28 |
| 2013/0188947 | A1 | * | 7/2013 | Lee et al. | 398/13 |
| 2014/0072296 | A1 | * | 3/2014 | Montalvo Garcia et al. | 398/16 |
| 2014/0098362 | A1 | * | 4/2014 | Takahashi et al. | 356/73.1 |
| 2014/0147109 | A1 | * | 5/2014 | Urban et al. | 398/20 |
| 2014/0226970 | A1 | * | 8/2014 | Urban et al. | 398/21 |

FOREIGN PATENT DOCUMENTS

CN 1 866 790 A 11/2006

OTHER PUBLICATIONS

Jean Ponchon et al: "PON test systems—From theory to field deployments"; Optical Fiber Communication Conference; 2011; Technical Digest; OFC/NFOEC, IEEE, Mar. 6, 2011; pp. 1-3; XP031946144; ISBN: 978-1-4577-0213-6.

Swook Hann et al: "Monitoring technique for a hybrid PS/WDM-PON by using a tunable OTDR and FBGs; Monitoring technique for a hybrid PS/WDM-PON"; Measurement Science and Technology, IOP, Bristol, GB; vol. 17, No. 5; May 1, 2006; pp. 1070-1074; XP020103495; ISSN: 0957-0233; DOI: 10.1088/0957-0233/17/5/S22.

* cited by examiner

*Primary Examiner* — Gordon J Stock, Jr.
(74) *Attorney, Agent, or Firm* — McGarry Bair PC

(57) ABSTRACT

A method is provided for mapping the position of a customer fiber end on a passive optical network (PON). The method comprises the steps of: connecting an optical reflector to a specific customer fiber end; carrying out an optical time domain reflectometer (OTDR) trace of the a passive optical network utilising a central office OTDR device; identifying a target reflection event in the OTDR trace having an increased amplitude relative to other reflection events in the OTDR trace, consequent upon the presence of the optical reflector; and mapping data associated with the target reflection event to the specific customer.

13 Claims, No Drawings

OTDR MAPPING METHOD

CROSS-REFERENCE TO RELATED APPLICATIONS

This application is a National Phase application of International Application No. PCT/GB2013/050079, filed Jan. 15, 2013, which claims the benefit of U.K. Patent Application No. 1202347.9, filed Feb. 10, 2012, both of which are incorporated herein by reference in their entirety.

This invention relates to a mapping method featuring an enhanced optical time domain reflectometer (OTDR) measurement technique, for use in a fibre to the home (FTTH) passive optical network (PON). The method enables a specific customer fibre end, and thus the optical network termination (ONT) located at that customer fibre end, to be definitively mapped to a target reflection event in an OTDR trace.

The term "mapping" as used herein refers to the association of data from a target reflection event in an OTDR trace with a specific customer fibre end on the network, and the recording of that data and association In a fibre to the home (FTTH) network, a single optical fibre from the service provider's central office is typically split into 64 customer fibres so as economically to provide fibre optic broadband to a large number of customers. It is envisaged that the next generation of fibre optic networks will involve the splitting of a fibre from the service provider's central office into 128 customer fibres. In practice, passive optical networks (PONS) may use one or more sequential splitters depending on the physical network topography. The resulting point to multipoint network has a tree structure and can be quite complex.

Faults in an optical fibre network can be located using optical time domain reflectometers (OTDRs). These devices fire pulses of light into one end of the fibre network and identify the relative position of discontinuities and customer fibre far end reflections by measuring the relative time delay of each reflection event. This data can also be utilised this to calculate the length of the optical fibre from the central office to the customer fibre ends, and/or from the splitter to the customer fibre ends.

In order effectively to use an OTDR for fault location from the service provider's central office it is essential that the far end reflection events from all of the individual customer fibres are individually identified and mapped to their specific customers in the OTDR trace. However, this is only possible if the length of the individual optical fibres between the splitters and the fibre ends associated with each customer is carefully managed. If two or more fibres have the same or similar lengths then their OTDR reflections will be superimposed or merged rendering the OTDR analysis ineffective. As a consequence, it is necessary for the length of each customer fibre from the splitter to the fibre end to be unique and distinct from the length of all other customer fibres emanating from the same splitter.

In practice, creating a network with an adequate spacing of individual customer fibre lengths, to enable the use of a central office OTDR, is not straightforward. Conventionally, a hand-held OTDR is used during the installation process to measure the length of the fibre between each customer fibre end and the splitter. This measurement is then used to identify an associated reflection event in the central office OTDR trace. The hand-held OTDR measurement will however be subject to a margin of error, as too will the central office OTDR measurement. As a consequence, it is necessary to provide an increased spacing of the reflection events in the central office OTDR trace so as to accommodate each of these margins of error, and so to enable each reflection event to be definitively identified using the hand held OTDR data.

This means that the difference in the unique lengths for each customer fibre relative to all other customer fibres emanating from the same splitter must be sufficiently large so as to accommodate the margins of error in the OTDR measurements, in order for a specific customer fibre end to be definitively associated with a particular reflection event in the OTDR trace. In practice, this leads to the additional splicing of extra lengths of fibre to the customer fibres purely for the purposes of identifying the specific customer on the OTDR trace. This practice is wasteful since it necessitates the use of lengths of optical fibre which would not otherwise be required in order to provide the broadband service to the customer.

The present invention seeks to address the above problem by providing a novel measurement technique, in which the central office OTDR directly associates reflective events to specific customer fibre ends. The method of the present invention serves to reduce the required spacing for reflective events when compared to conventional OTDR resolution, and thus in turn reduces the required relative difference between the unique lengths of each customer fibre, in order for each specific customer to be definitively associated with a particular reflection event in the OTDR trace.

Consequently, the wasteful practice of utilising otherwise unnecessary lengths of optical fibre for the purposes of distinguishing between customers on the OTDR trace can be greatly reduced, or even eliminated. The method of the present invention also removes the need for hand held OTDR devices during the installation of customer fibres. As a consequence of these benefits, it is envisaged that PON installation and rollout costs will be dramatically reduced.

According to the present invention, there is provided a method for mapping the position of a customer fibre end on a passive optical network (PON), comprising the steps of:

connecting an optical reflector to a specific customer fibre end;

carrying out an optical time domain reflectometer (OTDR) trace of the PON utilising a central office OTDR device;

identifying a target reflection event in the OTDR trace having an increased amplitude relative to other reflection events in the OTDR trace; and mapping data associated with the target reflection event to the specific customer.

The term "mapping" as used herein refers to the association of data from a target reflection event in an OTDR with a specific customer on the network, and the recording of that data and association. The data may include: the length of the optical fibre from the service provider's central office (or the splitter) to the customer fibre end; and/or the position of the specific customer fibre end in a sequence comprising all customer fibres emanating from the same splitter, ranked according to said length of the optical fibre from the service provider's central office (or the splitter) to the customer fibre end. The latter data may more conveniently be mapped simply in terms of the sequential position of reflection events in the OTDR trace. The mapped data is preferably recorded in a database associated with the central office OTDR device.

The method of the present invention preferably comprises an additional preliminary step of carrying out an initial background OTDR trace of the PON utilising the central office OTDR device, prior to connecting the optical reflector. The initial background OTDR trace can then be compared with the subsequent OTDR trace carried out after connecting the optical reflector, in order to facilitate identification of the target reflection event having an increased amplitude associated with the presence of the optical reflector at the specific customer fibre end.

The optical reflector is preferably a mirror reflector. The optical reflector is preferably disconnected from the customer fibre end once the target reflection event associated with the specific customer has been identified in the OTDR trace.

In order that the present invention may be clearly understood, a preferred embodiment thereof will now be described in detail, though only by way of example.

As noted hereinbefore, in a fibre to the home (FTTH) passive optical network (PON), a single optical fibre from the service provider's central office runs to a splitter, where it is split into 64, or 128, individual customer fibres, each of which then runs to an individual customer's premises, with a specific customer optical network termination (ONT) being provided at the end of each customer fibre.

When installing customer fibres in a PON according to the method of the present invention, the installing technician no longer needs to use a hand held OTDR device to carry out a measurement from the customer fibre end, of the length of the customer fibre to the splitter, as with prior art methods. Instead, the installing technician remotely prompts the service provider's central office OTDR device to take an initial background trace of that specific fibre network. This trace will show many closely spaced reflection events, each representing a specific customer ONT at an existing customer fibre end, and each having a specific and unique data value corresponding to the length of the optical fibre from the splitter to the customer fibre end.

The target reflection event from the new customer fibre being installed could be anywhere amongst the many reflection events on the OTDR trace, or it may even be masked by an existing reflection event from an existing customer fibre having the same or a similar length. To identify the target reflection event associated with the new customer fibre, the installation technician then temporarily connects a mirror reflector to the customer end of the fibre and remotely prompts the central office OTDR to repeat the OTDR trace measurement.

The connection of the mirror reflector dramatically increases the amplitude of the target reflection event associated with the new customer fibre end. The data associated with the target reflection event that is to say, the length of the optical fibre from the customer fibre end to the splitter, and the sequential position of the reflective event in the OTDR trace—can thus be definitively mapped to the new customer, since the target reflection event having the increased amplitude will clearly stand out from all other reflection events in the OTDR trace.

If the identified target reflection event coincides with, or is closely adjacent to, another reflection event in the OTDR trace already mapped to an existing customer then the central office OTDR device can definitively identify the fact that the new fibre connection has the same length as an existing customer fibre circuit. In this event, the central office OTDR device can then identify an area of the OTDR trace which is free from such potentially conflicting reflection events, and can calculate the exact length of fibre required to be spliced onto the customer fibre end in order to shift the target reflection event associated with the new customer fibre end to an area in the OTDR trace where it will be uniquely detectable. The required length of optical fibre can then be spliced to the specific customer fibre end, and the previously described OTDR mapping steps repeated.

The mirror reflector is removed once the specific customer fibre end has been definitively identified in the OTDR trace, and the associated data mapped to the specific customer.

The invention claimed is:

1. A method of mapping a position of an end of a specific customer fiber on a passive optical network (PON), comprising steps of:
   connecting an optical reflector to an end of a specific customer fiber;
   carrying out an optical time domain reflectometer (OTDR) trace of the PON utilising an OTDR device located at a central office;
   identifying a target reflection event in the OTDR trace having an increased amplitude relative to other reflection events in the OTDR trace;
   mapping data associated with the target reflection event to a specific customer; and
   determining whether said identified target reflection event on the OTDR trace conflicts with other reflection events associated with other customer optical network terminations (ONTs), and if so, performing additional steps of:
   identifying an area of the OTDR trace free from potentially conflicting reflection events; and
   calculating length of optical fiber required to be spliced to said specific customer fiber in order to shift said target reflection event to said area of the OTDR trace.

2. The method of claim 1, further comprising additional steps of:
   carrying out an initial background OTDR trace of the PON utilising said OTDR device located at a central office, prior to connecting the optical reflector; and
   comparing the initial background OTDR trace with the OTDR trace carried out subsequent to connecting the optical reflector in order to facilitate identification of the target reflection event having an increased amplitude.

3. The method of claim 1, wherein said step of carrying out an OTDR trace of the PON utilising an OTDR device located at a central office is initiated remotely from said end of said specific customer fiber.

4. The method of claim 1, wherein the optical reflector is a mirror reflector.

5. The method of claim 1, wherein said mapped data includes length of optical fiber from said central office to said end of said specific customer fiber.

6. The method of claim 1, wherein said mapped data includes length of optical fiber from said end of said specific customer fiber to a splitter from which said specific customer fiber emanates.

7. The method of claim 1, wherein said mapped data includes position of said end of said specific customer fiber in a sequence comprising all customer fibers emanating from a common splitter, ranked according to length of optical fiber from said central office to each customer fiber end in the PON.

8. The method of claim 1, wherein said mapped data includes position of said end of said specific customer fiber in a sequence comprising all customer fibers emanating from a common splitter, ranked according to length of optical fiber from said splitter to each customer fiber end.

9. The method of claim 1, wherein said mapped data include sequential position of an identified target reflection event in the OTDR trace.

10. The method of claim 1, further comprising an additional step of:
    disconnecting the optical reflector from said end of said specific customer fiber once the target reflection event associated with said end of said specific customer fiber has been identified in the OTDR trace.

11. The method of claim 1, wherein said mapped data is recorded in a database associated with the central office OTDR device.

12. The method of claim 1, further comprising additional steps of:
    splicing said calculated length of optical fiber to said specific customer fiber; and
    repeating said method steps of claim 1.

13. The method of claim 1, wherein said steps of identifying an area of the OTDR trace free from potentially conflicting reflection events and calculating required length of optical fiber are carried out by said OTDR device located at said central office.

* * * * *